(12) United States Patent
Kondo

(10) Patent No.: US 6,351,459 B1
(45) Date of Patent: Feb. 26, 2002

(54) CONTROL RANDOM ACCESS IN MOBILE COMMUNICATION SYSTEM WITHOUT INTERRRUPTING CONTINUOUS COMMUNICATIONS

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/198,512

(22) Filed: Nov. 24, 1998

(30) Foreign Application Priority Data

Nov. 28, 1997 (JP) .............................................. 9-329063

(51) Int. Cl.[7] .............................. H04B 7/216; H04J 3/24; H04J 3/16; H04L 12/43; H04Q 7/20
(52) U.S. Cl. ....................... 370/330; 370/342; 370/437; 370/335; 370/348
(58) Field of Search ................................ 370/329, 337, 370/348, 443, 459, 458, 342, 349, 437; 455/436, 437, 438, 439, 524

(56) References Cited

U.S. PATENT DOCUMENTS

| | | | | |
|---|---|---|---|---|
| 5,420,864 A | * | 5/1995 | Dahlin et al. .............. | 370/95.3 |
| 5,430,760 A | * | 7/1995 | Dent .......................... | 375/200 |
| 5,581,547 A | * | 12/1996 | Umeda et al. .............. | 370/342 |
| 5,673,259 A | * | 9/1997 | Quick, Jr. ................... | 370/342 |
| 5,680,398 A | * | 10/1997 | Robinson .................... | 370/458 |
| 5,689,503 A | * | 11/1997 | Wada et al. ................ | 370/337 |
| 6,181,941 B1 | * | 1/2001 | McCarthy ................... | 455/436 |

FOREIGN PATENT DOCUMENTS

| | | |
|---|---|---|
| JP | 6-276176 | 9/1994 |
| JP | 9-55693 | 2/1997 |
| JP | 9-233051 | 9/1997 |

* cited by examiner

Primary Examiner—Ricky Ngo
Assistant Examiner—M. Phan
(74) Attorney, Agent, or Firm—Foley & Lardner

(57) ABSTRACT

A method of controlling random access is disclosed for a mobile communication system to prevent continuous communications such as speech communications from being interrupted. Random access communications for a mobile station to reserve an idle communication channel in a base station and continuous communications such as speech communications between the mobile and base stations are effected in different frequency bands or time slots respectively. The mobile station lowers a spreading ratio and a symbol rate for random access communications.

12 Claims, 13 Drawing Sheets

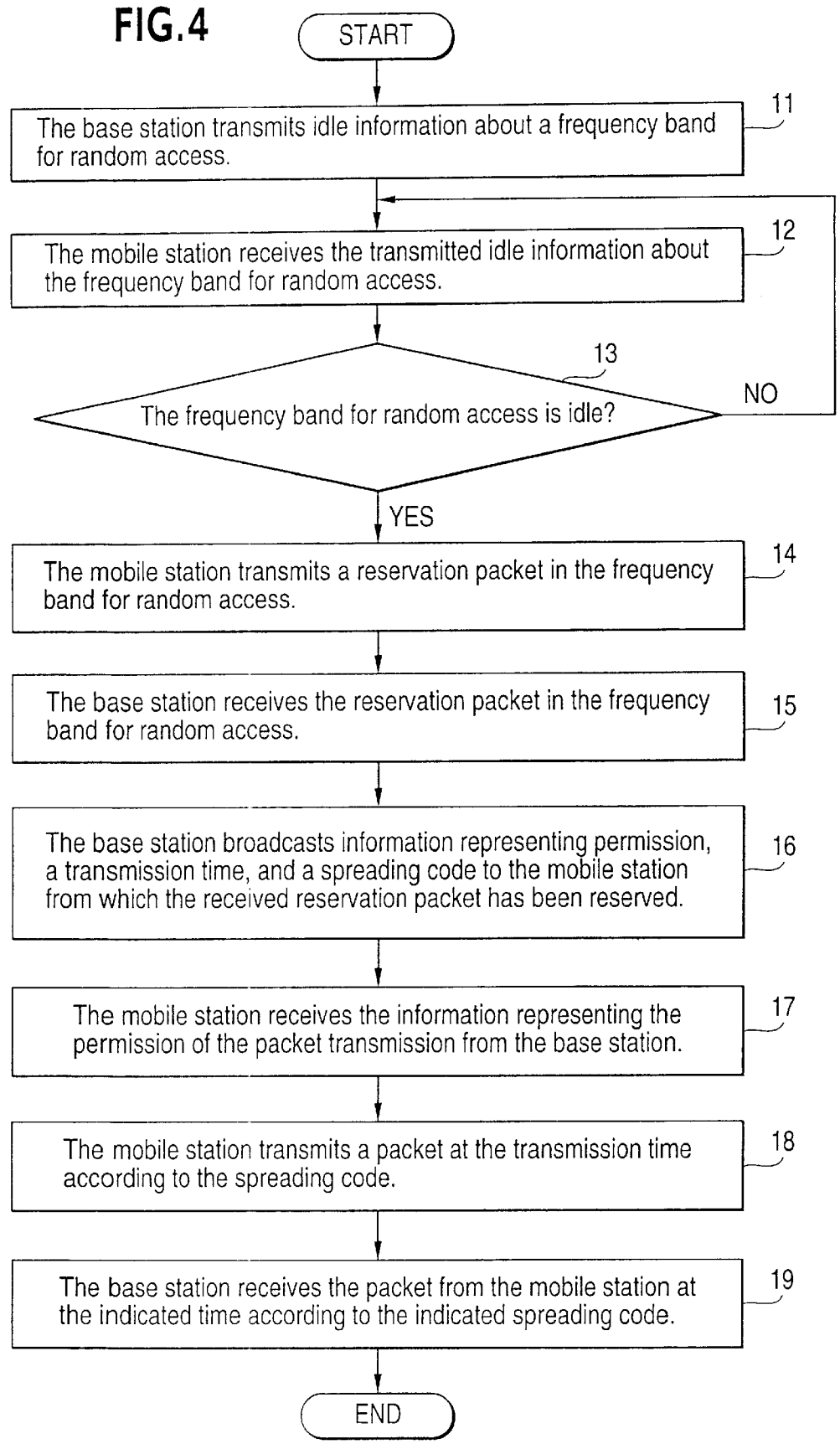

FACH (Forward Access CHannel)

RACH (Random Access CHannel)

UPCH (User Packet CHannel)

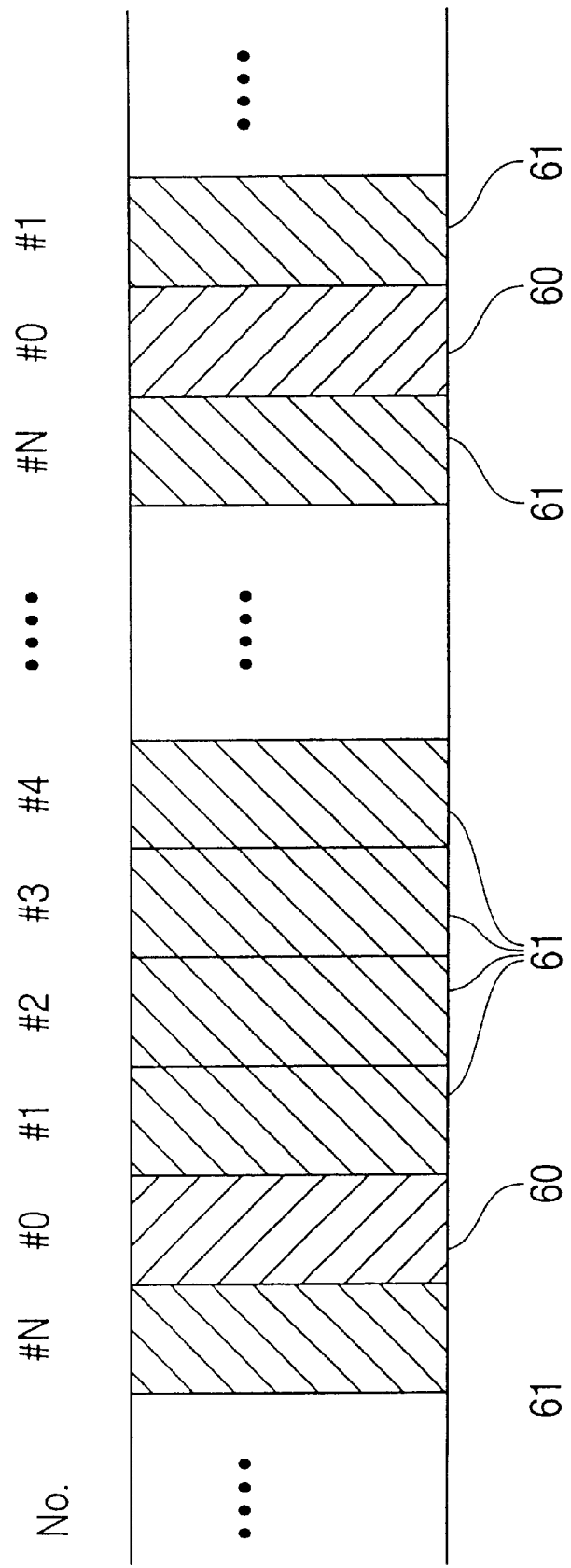

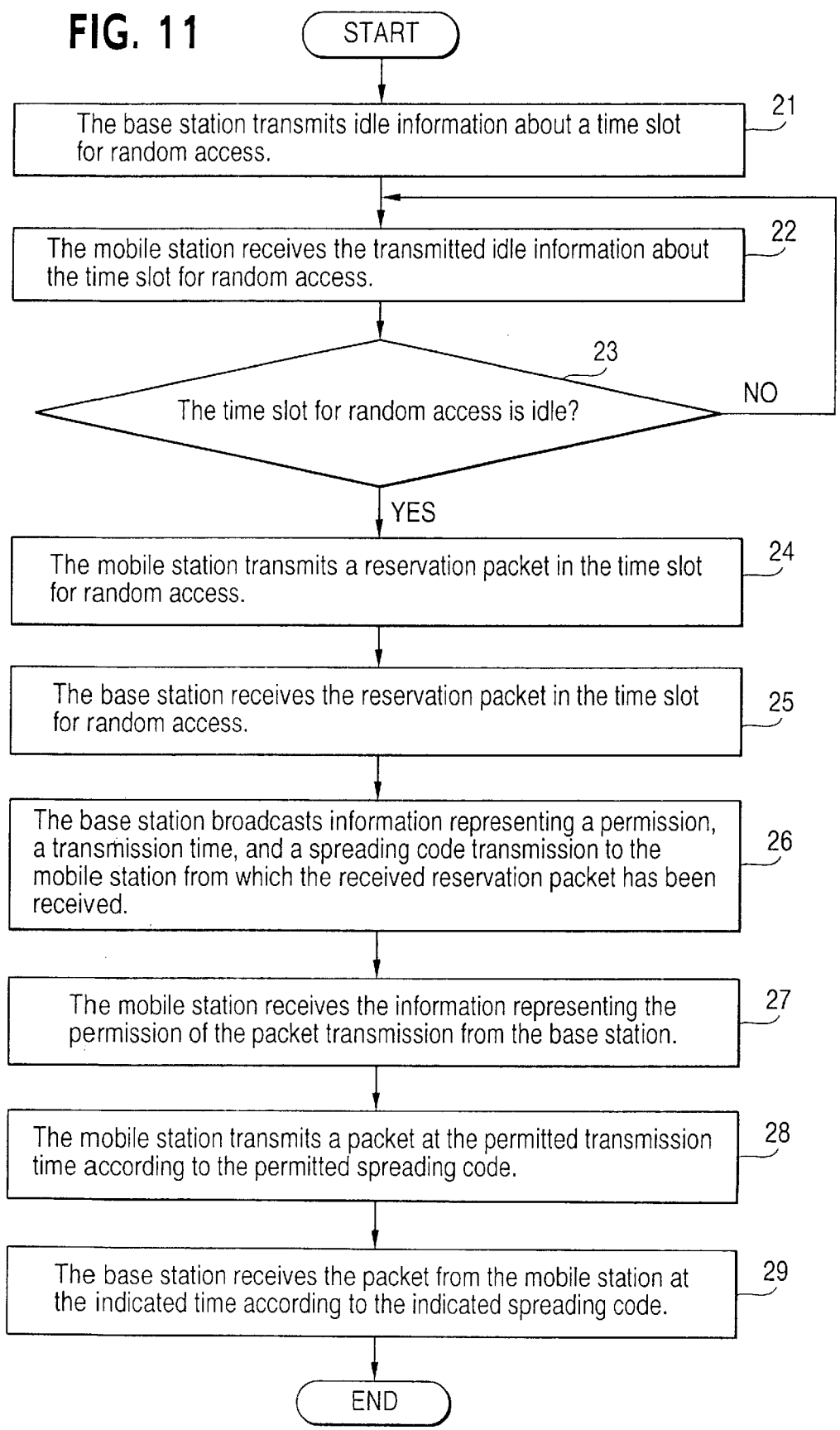

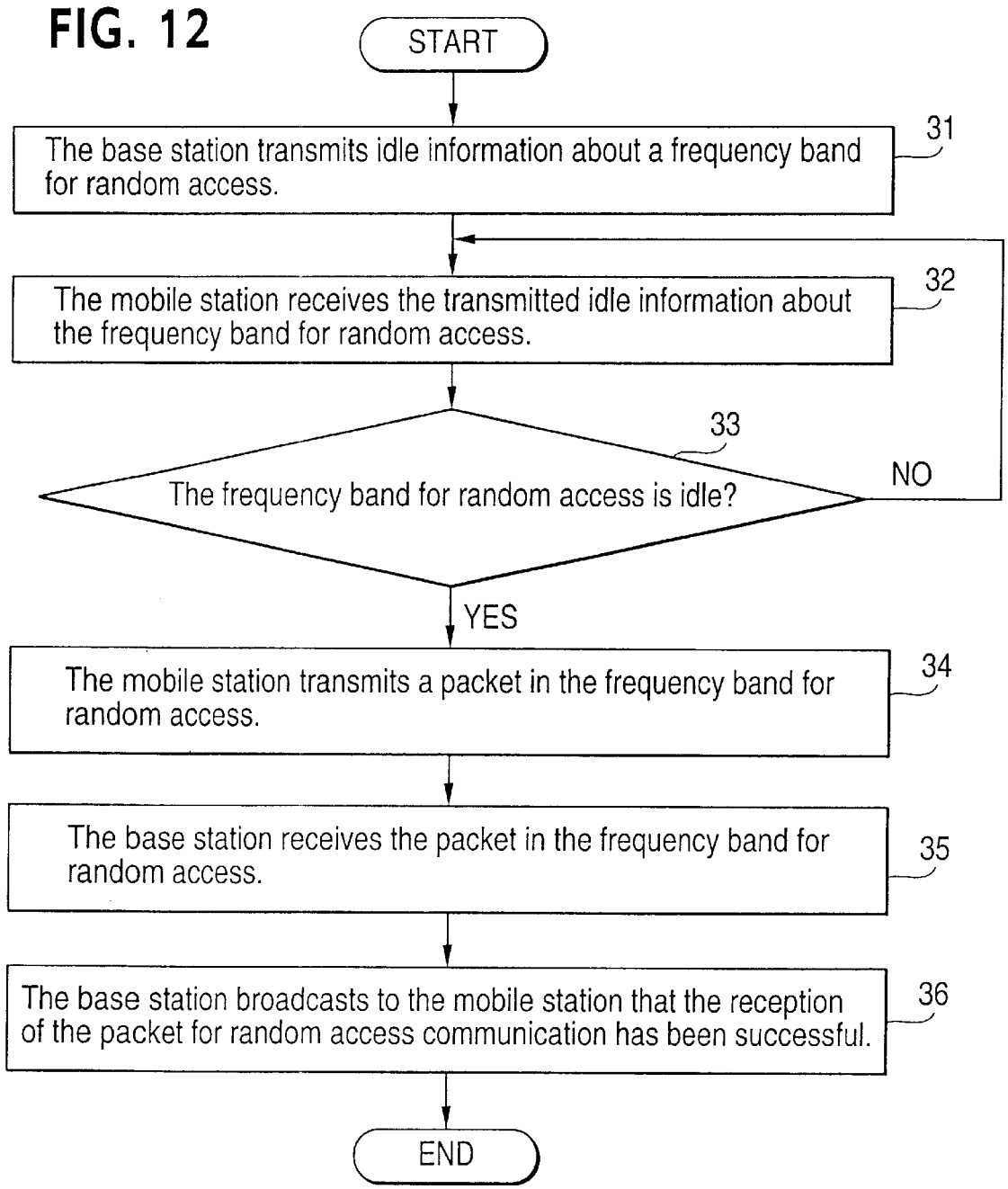

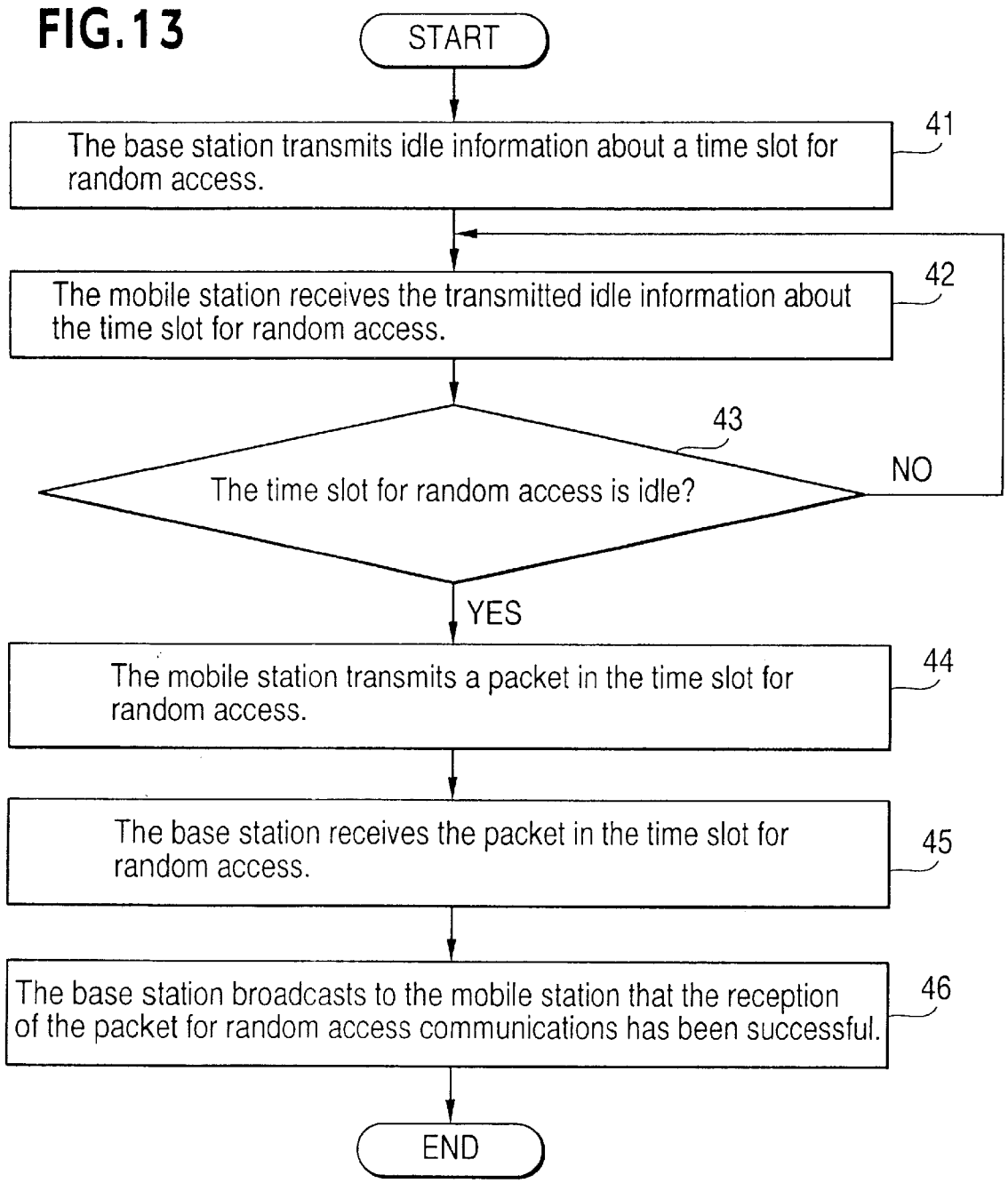

CONTROL RANDOM ACCESS IN MOBILE COMMUNICATION SYSTEM WITHOUT INTERRRUPTING CONTINUOUS COMMUNICATIONS

BACKGROUND OF THE INVENTION

1. Field of the Invention

The present invention relates to a method of controlling random access in a mobile communication system.

2. Description of the Related Art

Mobile communication systems based on code division multiple access (CDMA) employ a control process for starting packet transmissions from mobile stations. One such known control process, which is disclosed in Japanese laid-open patent publication No. 55693/97, for example, is made up of the following steps:

(1) First, a mobile station from which a packet transmission is to occur transmits a short burst, called a reservation packet, shorter than ordinary frame units, to a base station.

(2) When the base station receives the reservation packet, the base station permits the mobile station to transmit the packet frame which is reserved.

(3) Since the packet transmission is permitted, the mobile station transmits the packet frame.

The above control process is effective to increase the throughput of packet communications.

In a mobile communication system based on CDMA, as shown in FIG. 1 of the accompanying drawings, reservation packets for random access and information representing data packets that are continuous information and speech are transmitted and received within the same frequency band by code multiplexing. If the transmission power for reservation packets is large or reservation packets are concentrated to the extent beyond the communication capacity limit, then the level of interference within the same frequency band becomes higher than the allowable level for communications that use the frequency band. As a result, all communications that use the same frequency band fail to be received, interrupting the transmission and reception of continuous information such as speech information.

SUMMARY OF THE INVENTION

It is therefore an object of the present invention to provide a method of controlling random access in a mobile communication system based on CDMA to prevent continuous communications such as speech communications from being interrupted even when the load of random access communications varies.

In a method of controlling random access according to an aspect of the present invention, random access communications by mobile station for reserving an idle communication channel at a base station and continuous communications such as speech communications between the mobile and base stations are effected in different frequency bands or time slots respectively. Consequently, any effect which variations in the load of random access communications have on continuous communications such as speech communications can be eliminated or minimized.

Furthermore, in an embodiment of the present invention a mobile station lowers the spreading ratio and symbol rate for random access communications, thereby reducing the frequency band assigned for the random access communications. Consequently, the proportion of continuous communications such as speech communications can be increased.

In a method of controlling random access according to another aspect of the present invention, random access communications and continuous communications such as speech communications are effected in different frequency bands or time slots respectively, and the mobile station transmits a packet of continuous information such as speech information via a random access channel to the base station. When the reception of the packet through the random access communications is successful, the base station notifies the mobile station of the fact that the reception of the packet is successful. As a result, continuous communications such as speech communications are prevented from being interrupted.

The above and other objects, features and advantages of the present invention will become apparent from the following description with reference to the accompanying drawings which illustrate examples of the present invention.

BRIEF DESCRIPTION OF THE DRAWINGS

FIG. 4 is a flowchart of an operation sequence of the mobile communication system shown in FIG. 3;

FIG. 5b is a diagram showing the frequency band of the signal shown in FIG. 5a;

FIG. 6b is a diagram showing the frequency band of the signal shown in FIG. 6a;

FIG. 10 is a diagram illustrative of how time slots are used in a mobile communication system for carrying out a method of controlling random access according to a second embodiment of the present invention;

FIG. 11 is a flowchart of an operation sequence of the mobile communication system for carrying out the method of controlling random access according to the second embodiment of the present invention;

FIG. 12 is a flowchart of an operation sequence of a mobile communication system for carrying out a method of controlling random access according to a third embodiment of the present invention; and FIG. 13 is a flowchart of an operation sequence of a mobile communication system for carrying out a method of controlling random access according to a fourth embodiment of the present invention.

DETAILED DESCRIPTION OF THE PREFERRED EMBODIMENTS

1st Embodiment

Figure 1:
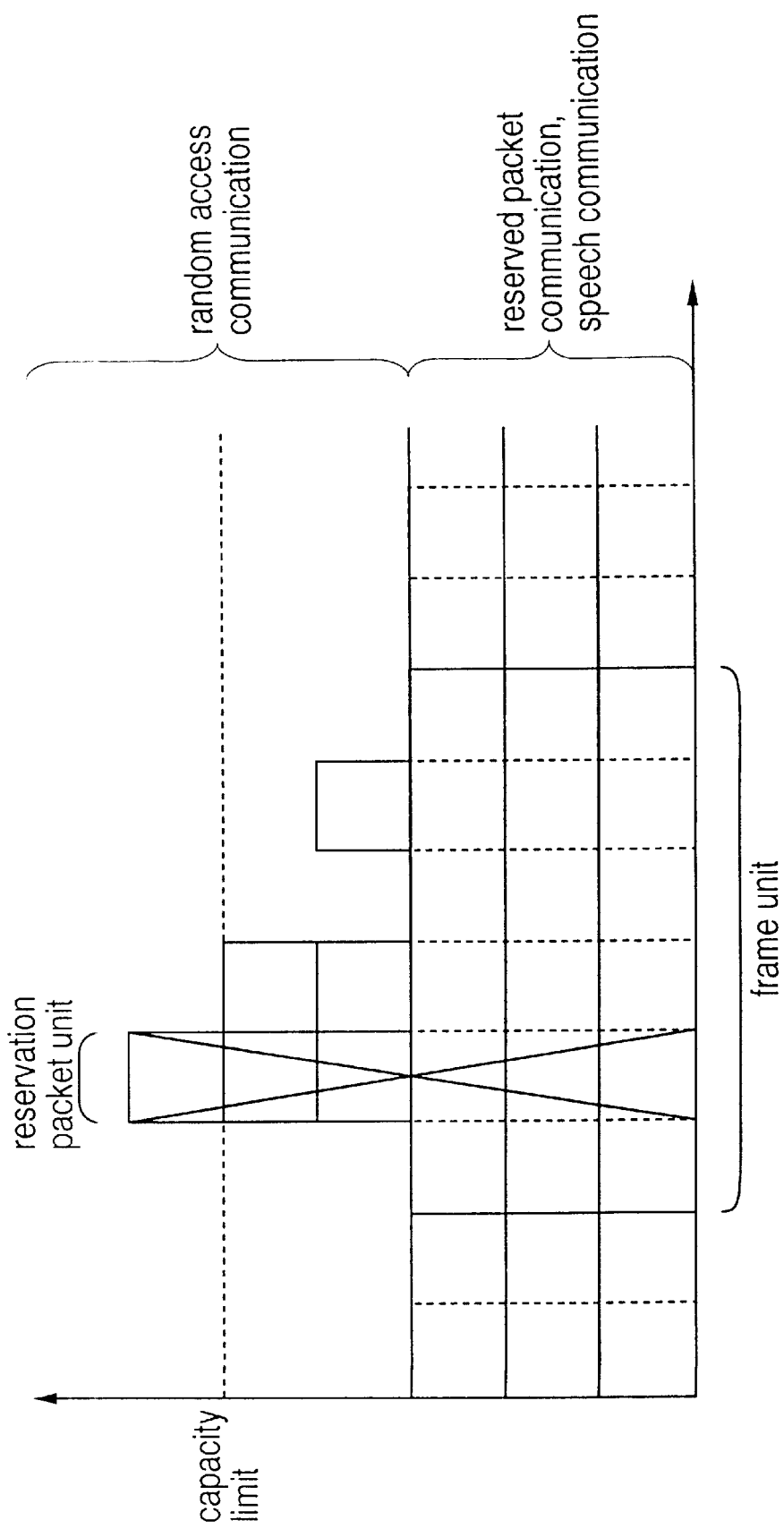
FIG. 1 is a diagram illustrative of how a conventional mobile communication system operates.
Figure 2:
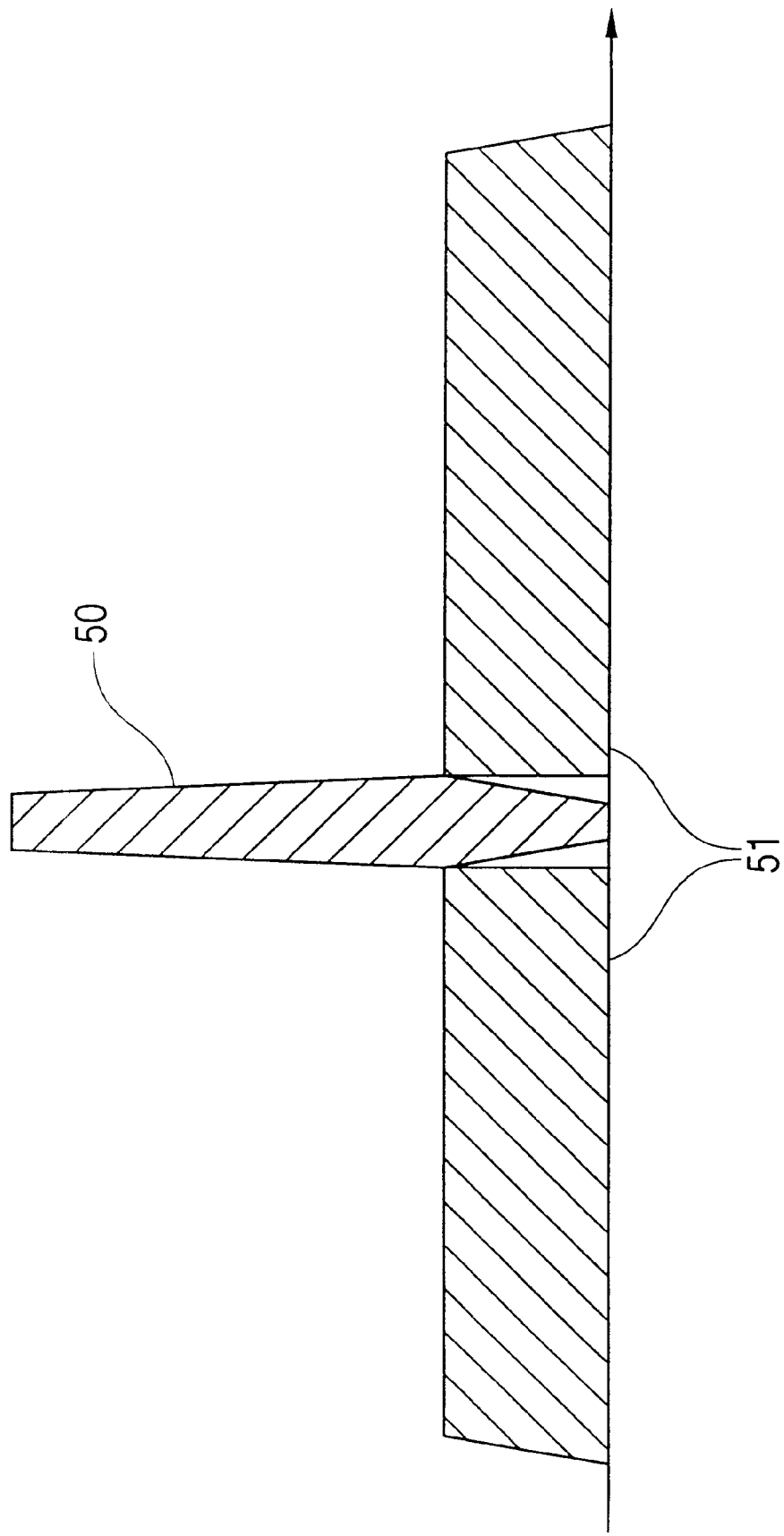
FIG. 2 is a diagram illustrative of the allocation of frequency bands for random access communications and communications other than the random access communications in a method of controlling random access according to a first embodiment of the present invention.

As shown in FIG. 2, random access communications 50 and continuous communications such as speech communications 51 are separated from each other by being assigned to different frequency bands.

Figure 3:
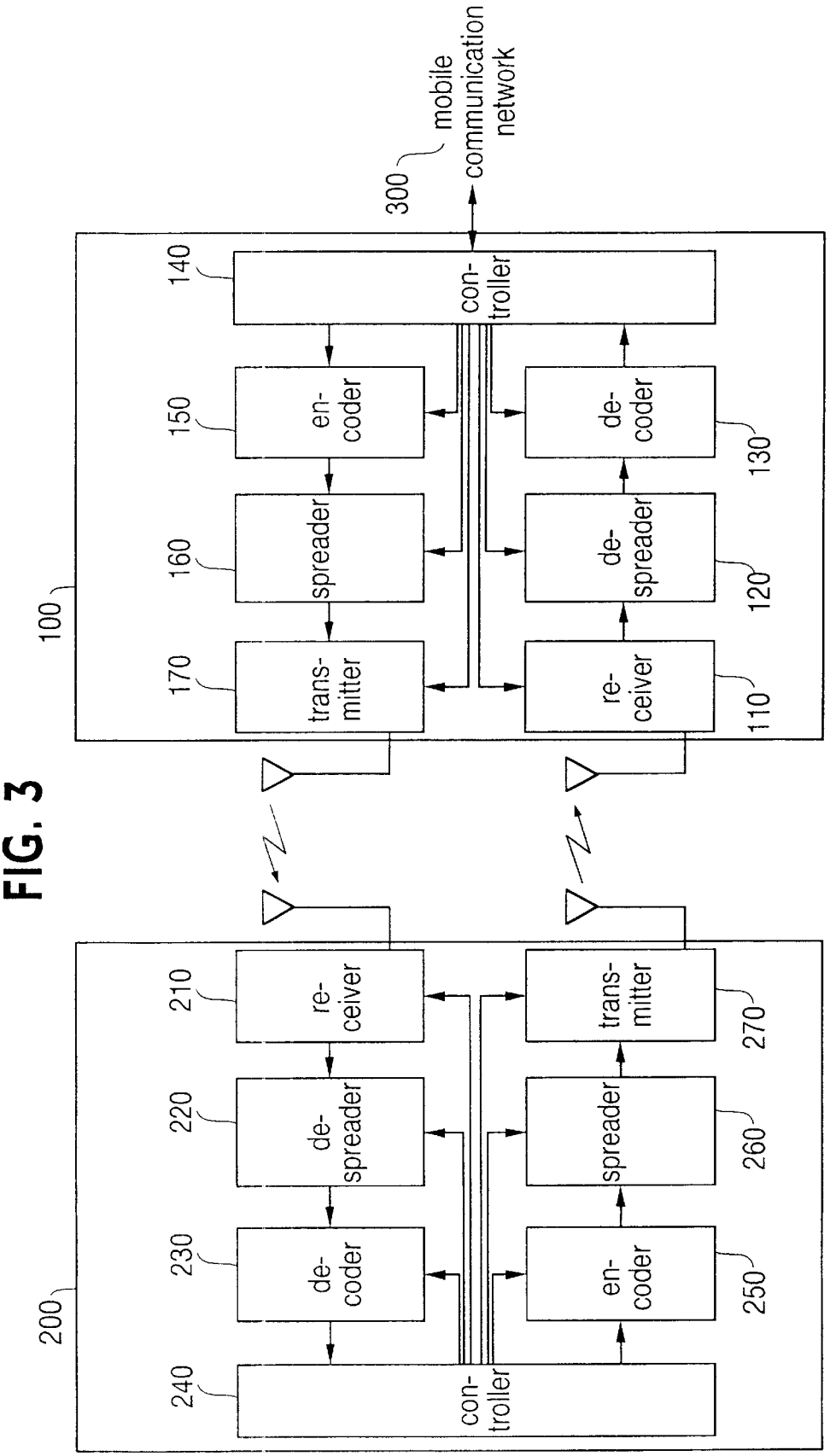
FIG. 3 is a block diagram of a mobile communication system for carrying out the method of controlling random access according to the first embodiment of the present invention.

FIG. 3 shows in block form a mobile communication system for carrying out a method of controlling random access according to a first embodiment of the present invention. As shown in FIG. 3, the mobile communication system generally comprises a mobile communication network 300, a base station 100, and a mobile station 200 for communicating with the base station 100.

As shown in FIG. 3, the mobile station 200 comprises a receiver 210, a despreader 220, a decoder 230, a controller 240, an encoder 250, a spreader 260, and a transmitter 270.

The receiver 210 receives a signal transmitted from the base station 100. The despreader 220 despreads the signal received by the receiver 210 according to a predetermined despreading code. The decoder 230 decodes information contained in the received signal which has been despread by the despreader 220. The encoder 250 encodes a signal to be transmitted which is generated by the controller 240. The spreader 260 spreads the signal to be transmitted which has been encoded by the encoder 250 according to a predetermined spreading code. The transmitter 270 transmits the signal spread by the spreader 260.

The controller 240 controls the receiver 210, the despreader 220, and the decoder 230 to receive and decode a signal transmitted from the base station 100. The controller 240 also controls the encoder 250, the spreader 260, and the transmitter 270 to transmit information to the base station 100.

Operation of the controller 240 will be described in detail below.

The controller 240 controls the receiver 210, the despreader 220, and the decoder 230 to receive a signal transmitted from the base station 100 and decode idle information about a frequency band for random access which is contained in the received signal. If there is an idle frequency band for random access, then the controller 240 controls the spreader 260 and the transmitter 270 to spread a reservation packet for reserving a packet transmission according to the predetermined spreading code, and transmits the reservation packet using the idle frequency band for random access.

Thereafter, if information indicative of permission for a packet transmission from the mobile station 200 is supplied, then the controller 240 controls the receiver 210, the despreader 220, and the decoder 230 to receive and decode a signal representing the permission for the packet transmission. Then, the controller 240 also controls the encoder 250, the spreader 260, and the transmitter 270 to transmit the packet at a permitted time according to the spreading code.

The base station 100 comprises a receiver 110, a despreader 120, a decoder 130, a controller 140, an encoder 150, a spreader 160, and a transmitter 170.

The receiver 110 receives a signal transmitted from the mobile station 200. The despreader 120 despreads the signal received by the receiver 110 according to a predetermined despreading code. The decoder 130 decodes information contained in the received signal which has been despread by the despreader 120. The encoder 150 encodes a signal to be transmitted which is generated by the controller 140. The spreader 160 spreads the signal to be transmitted which has been encoded by the encoder 150 according to a predetermined spreading code. The transmitter 170 transmits the signal spread by the spreader 160.

The controller 140 controls the receiver 110, the despreader 120, and the decoder 130 to receive and decode a signal transmitted from the mobile station 200. The controller 140 also controls the encoder 150, the spreader 160, and the transmitter 170 to transmit information to the mobile station 200.

Operation of the controller 140 will be described in detail below.

The controller 140 controls the encoder 150, the spreader 160, and the transmitter 170 to transmit a broadcasting signal representing idle information about a frequency band for random access to the mobile station 200.

In response to the broadcasting signal transmitted from the base station 100, the mobile station 200 transmits a reservation packet, if necessary, to the base station 100. The controller 140 controls the receiver 110, the despreader 120, and the decoder 130 to receive the reservation packet from the mobile station 200 in a frequency band for random access according to a spreading code for random access.

Then, the controller 140 controls the encoder 150, the spreader 160, and the transmitter 170 to transmit broadcast information to the mobile station 200, which contains information indicative of permission for a packet transmission and information indicative of a transmission time and a spreading code. The mobile station 200 now transmits a packet in response to the permission of the packet transmission. The controller 140 controls the receiver 110, the despreader 120, and the decoder 130 to receive the packet from the mobile station 200 at the transmission time indicated by the broadcast information according to the spreading code indicated by the broadcast information.

FIG. 4 shows an operation sequence of the mobile communication system shown in FIG. 3. The mobile communication system carries out random access communications in a frequency band which does not degrade, or minimizes adverse effects, on continuous communications such as speech communications, e.g., a frequency band adjacent to a frequency band used for continuous communications as shown in FIG. 2.

Operation of the mobile communication system shown in FIG. 3 will be described below with reference to FIG. 4.

The base station 100 transmits idle information about a frequency band for random access in step 11. The mobile station 200 receives the transmitted idle information about the frequency band for random access in step 12.

The mobile station 200 decides whether the frequency band for random access is idle or not in step 13. If a frequency band for random access is idle, then the mobile station 200 transmits a reservation packet in the frequency band for random access according to a spreading code for random access in step 14. If a frequency band for random access is not idle, then the mobile station 200 waits until a frequency band for random access becomes idle.

In step 15, the base station 100 receives the reservation packet in the frequency band for random access according to the spreading code for random access from the mobile station 200. The base station 100 broadcasts information representing permission, a transmission time, and a spreading code for a packet transmission to the mobile station 200 from which the received reservation packet has been received, in step 16.

In step 17, the mobile station 200 receives the information representing the permission of the packet transmission from the base station 100. The mobile station 200 transmits a packet at the transmission time according to the spreading code in step 18. Then, the base station 100 receives the packet from the mobile station 200 at the indicated time according to the indicated spreading code.

In this embodiment, the mobile station 200 carries out random access communications in a frequency band which does not degrade, or minimizes adverse effects on, continuous communications such as speech communications, as described above. If a frequency band for random access communications and a frequency band for continuous communications such as speech communications are completely separate from each other in a frequency space, then the quality of the continuous communications such as speech communications is not impaired by the random access communications.

If a frequency band for random access communications and a frequency band for continuous communications such as speech communications overlap each other in frequency space, then the quality of the continuous communications such as speech communications is adversely affected by the random access communications because they interfere with each other depending on the power overlapped. Since the available frequency bands are limited, it is an effective practice to establish a frequency band used for random access communications in a valley between frequency bands used for continuous communications such as speech communications for effectively utilizing frequencies and allowing a certain amount of quality degradation, as shown in FIG. 2.

If a frequency band used for random access communications can be narrowed, the extent the frequency band is narrowed can be used for continuous communications such as speech communications. The frequency band of a radio channel is determined by the code rate of a signal transmitted in the radio channel, substantially according to the following equation:

Frequency band (Hz)=1/code rate (s)

and hence the frequency band can be narrowed by slowing the code rate.

Figure 5A:
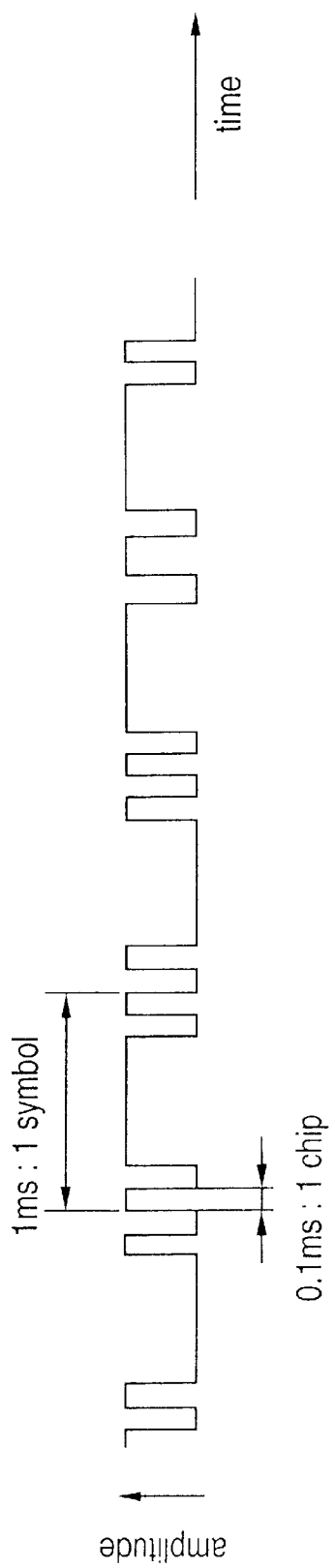
FIG. 5a is a diagram showing a signal having a code rate of 10 kcps.
Figure 5B:
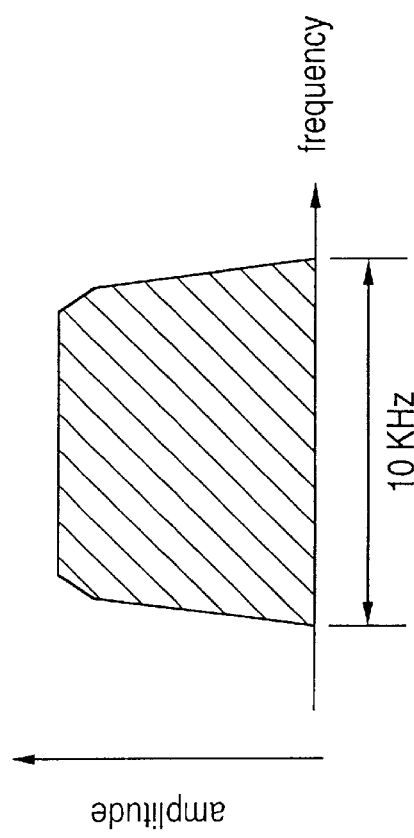
Figure 6A:
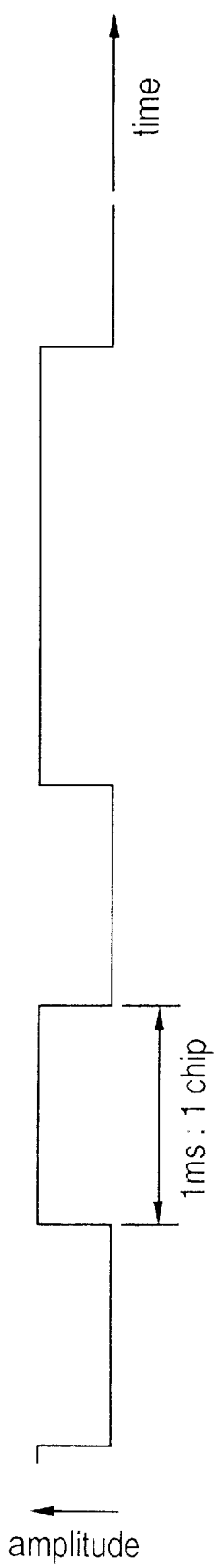
FIG. 6a is a diagram showing a signal having a code rate of 1 kcps.
Figure 6B:
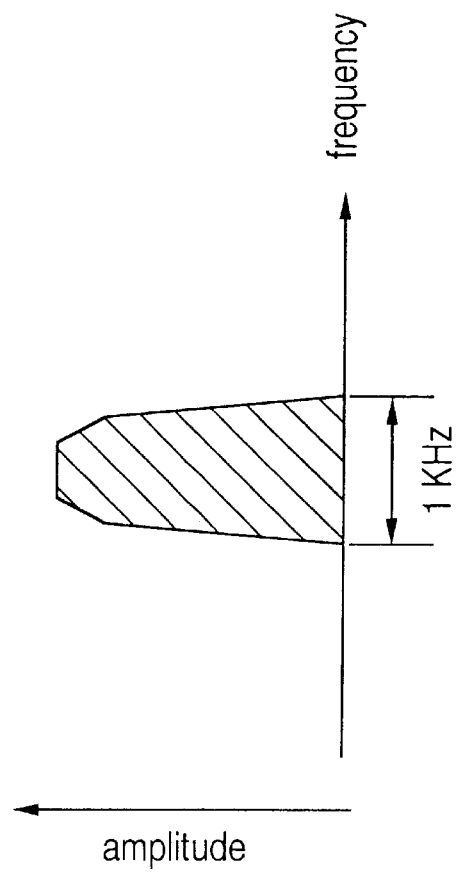

An example in which the frequency band is narrowed to 1/10 when the spreading ratio is 1/10 will be described below with reference to FIGS. 5a, 5b, 6a, and 6b. As shown in FIGS. 5a and 5b, when the symbol rate is 1 ksps (symbols/second) and the spreading ratio is 10, the code rate is 10 kcps (chips/second) and the frequency band is 10 kHz. As shown in FIGS. 6a and 6b, when the symbol rate is 1 ksps and there is no spreading (the spreading ratio is 1), the code rate is 1 kcps and the frequency band is 1 kHz. Therefore, by lowering one or both of the spreading ratio for random access communications and the symbol rate, the frequency band can be narrowed.

Figure 7:
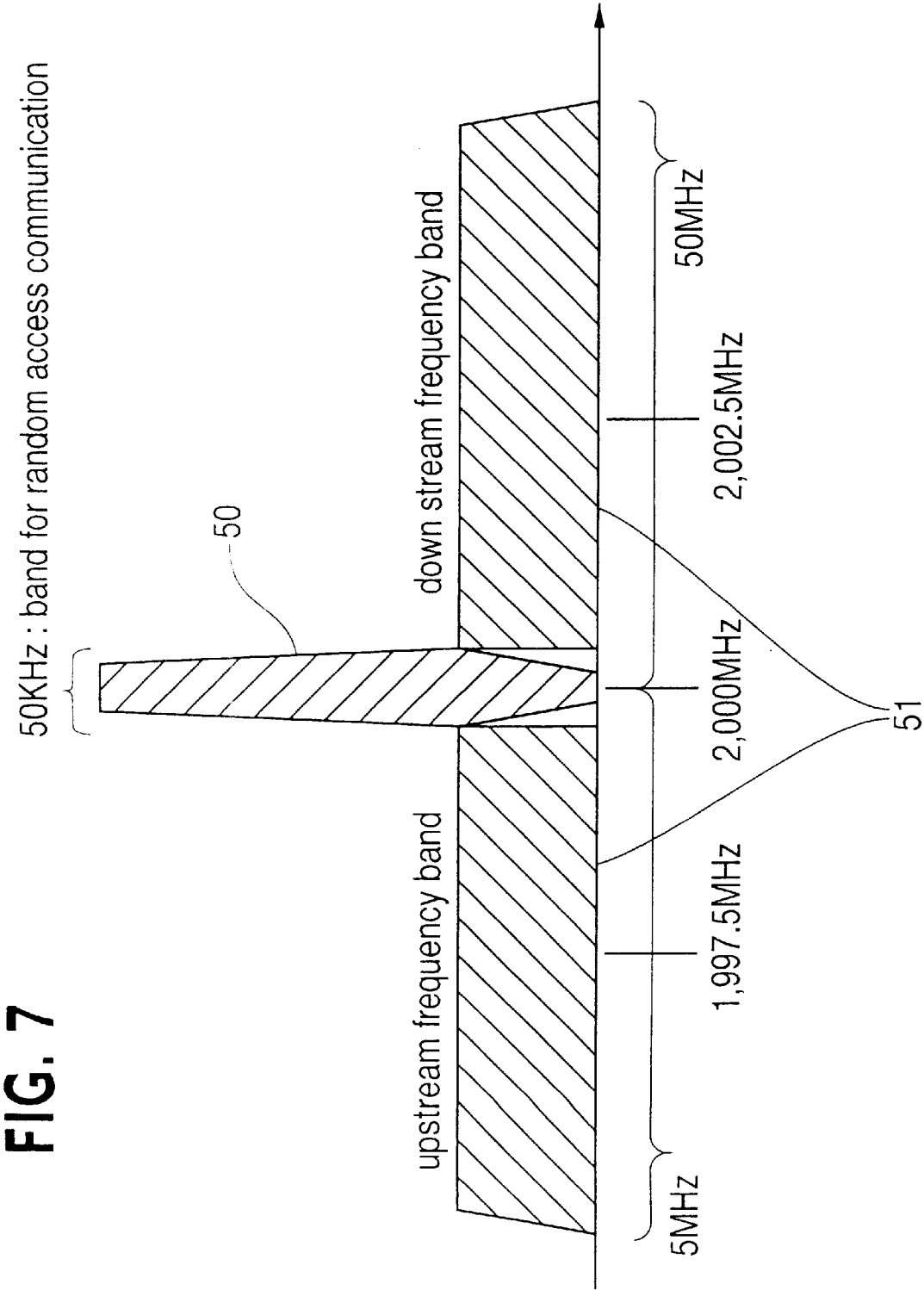
FIG. 7 is a diagram illustrative of the allocation of frequency bands in a specific example of the mobile communication system shown in FIG. 3.

A specific example of the first embodiment described above will be described below. According to the specific example, as shown in FIG. 7, an FDD (Frequency Division Duplex) process in which different frequencies are used by upstream and downstream communications is employed, and a frequency band for random access communications is assigned to a valley between upstream and downstream frequency bands. The specific example employs a mobile communication system which is basically the same as the mobile communication system according to the first embodiment described above. Therefore, operation of the specific example will be described below with reference to FIGS. 3, 4, 7, 8a–8c, and 9a–9d.

It is assumed that the symbol rate for continuous communications 51 such as speech communications is 64 ksps with one symbol being spread by 64 chips, and the symbol rate for random access communications 50 is 32 ksps with symbols being not spread. As shown in FIG. 7, each of the upstream and downstream frequency bands is 5 MHz, the upstream frequency band has a central frequency of 1997.5 MHz, the downstream frequency band has a central frequency of 2002.5 MHz, the frequency band for random access communications is 50 kHz and has a central frequency of 2000 MHz.

Communications are carried out between the base station and the mobile station according to the operation sequence shown in FIG. 4.

Figure 8A:
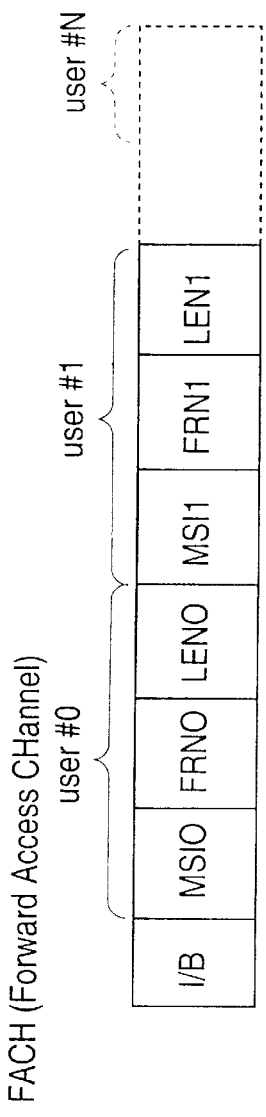
FIG. 8a is a diagram showing a signal format in FACH.
Figure 9A:
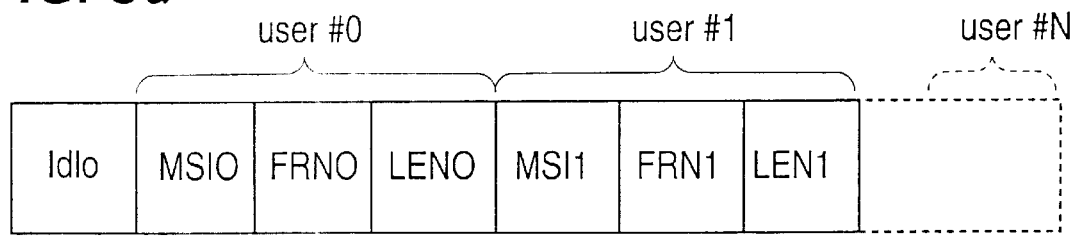
FIGS. 9a through 9d are diagram showing information transmitted and received between a base station and mobile stations in the specific example shown in FIG. 7.
Figure 9B:
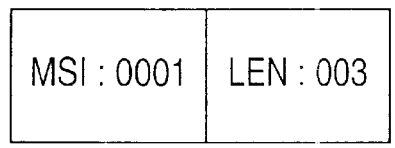

The base station 100 transmits a FACH (Forward Access Channel) for controlling random access communications in step 11. As shown in FIG. 8a or 9a, the FACH contains idle information I/B (Idle/Busy) about the frequency band for random access communications, a mobile station identifier MSI (Mobile Subscriber Identifier) of a mobile station whose packet transmission is permitted, a start frame number FRN (FRame Number), and a frame number LEN (LENgth) at which a packet is to be transmitted.

The mobile station 200 receives the FACH and decodes the idle information I/B about the frequency band for random access communications in step 12.

Figure 8B:
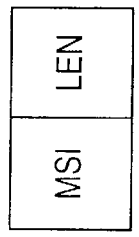
FIG. 8b is a diagram showing a signal format in RACH.
Figure 8C:
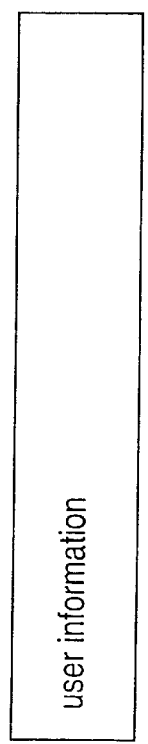
FIG. 8c is a diagram showing a signal format in UPCH.

The mobile station 200 decides whether the frequency band for random access is idle or not in step 13. If the frequency band for random access is idle, i.e., if the idle information I/B indicates "Idle", then the mobile station 200 transmits a RACH (Random Access Channel) in the frequency band for random access according to a spreading code for random access in step 14. As shown in FIG. 8b, the RACH contains a mobile station identifier MSI and a frame number LEN at which a packet is to be transmitted. In this example, the mobile station identifier MSI is 0001 and the number of frames with which a packet is to be transmitted is 3. If the frequency band for random access is not idle, i.e., if the idle information I/B indicates "Busy", then the mobile station 200 waits until the frequency band for random access becomes idle.

Figure 9C:
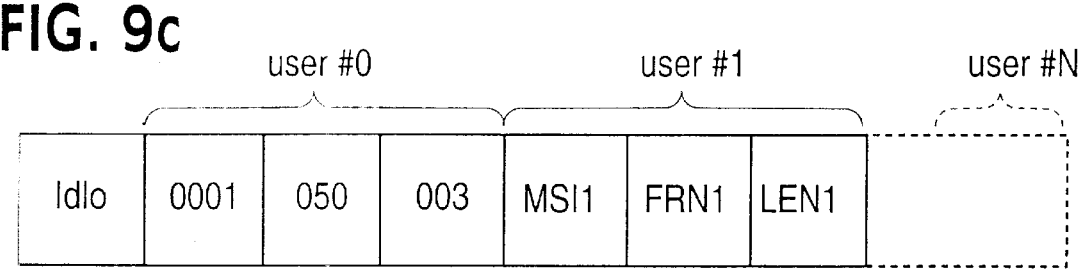

In step 15, the base station 100 receives the RACH in the frequency band for random access according to the spreading code for random access from the mobile station 200. The base station 100 sends a FACH containing a mobile station identifier MSI (=0001), a start frame number FRN (=050), and a frame number LEN (=003) to the mobile station 200 corresponding to the mobile station identifier MSI (=0001) contained in the received RACH, in step 16. The FACH sent by the base station 100 is shown in FIG. 9c.

Figure 9D:
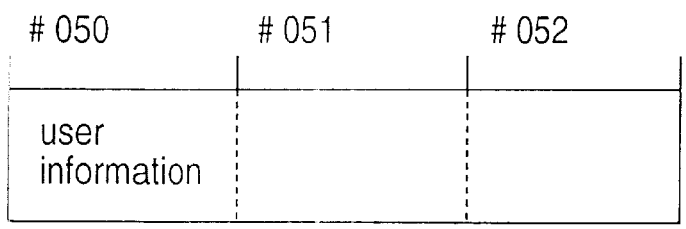

The mobile station 200 receives the FACH transmitted from the base station 100 in step 17. If the received FACH contains the mobile station identifier MSI (=0001) of its own, then the mobile station 200 extracts the start frame number FRN (=050) and the frame number LEN (=003). Then, the mobile station 200 transmits a packet at the permitted transmission time FRN (=050) over the permitted frame length LEN (=003) using the permitted spreading code, in step 18. The packet transmitted from the mobile station 200 is shown in FIG. 9d.

The base station 100 receives the packet transmitted from the mobile station 200 (MSI=0001) whose packet transmission has been permitted, at the indicated time (FRN=050) according to the indicated spreading code over the permitted frame length (FRN=003), in step 19.

2nd Embodiment

A mobile communication system for carrying out a method of controlling random access according to a second embodiment of the present invention is basically the same as the mobile communication system for carrying out the method of controlling random access according to the first embodiment of the present invention. The method of controlling random access according to the second embodiment of the present invention will be described below with reference to FIGS. 3 and 10.

In the mobile station 200, the controller 240 controls the receiver 210, the despreader 220, and the decoder 230 to receive and decode idle information about a time slot for random access. If the time slot for random access is idle, then the spreader 260 and the transmitter 270 transmit a reservation packet in the time slot for random access according to a spreading code for random access.

In the mobile station 200, the receiver 210, the despreader 220, and the decoder 230 receive and decode information, transmitted from the base station 100, indicative of a permission of a packet transmission from the mobile station 200.

In the mobile station 200, the controller 240 controls the encoder 250, the spreader 260, and the transmitter 270 to transmit a packet at a transmission time permitted by the base station 100 according to a spreading code permitted by the base station 100.

In the base station 100, the controller 140 also controls the encoder 150, the spreader 160, and the transmitter 170 to transmit idle information about a time slot for random access to the mobile station 200. In response to the idle information transmitted from the base station 100, the mobile station 200 transmits a reservation packet, if necessary, to the base station 100. The receiver 110, the despreader 120, and the decoder 130 in the base station 100 receive the reservation packet from the mobile station 200 in a time slot for random address according to a spreading code for random access.

Then, the encoder 150, the spreader 160, and the transmitter 170 in the base station 100 transmit broadcast information to the mobile station 200 that has transmitted the reservation packet, which contains information indicative of a permission of a packet transmission and information indicative of a transmission time and a spreading code.

The mobile station 200 whose packet transmission is permitted now transmits a packet to the mobile station 100. The receiver 110, the despreader 120, and the decoder 130 in the mobile station 200 receive the packet from the mobile station 200 at the indicated transmission time according to the indicated spreading code.

FIG. 10 illustrates how time slots are used in the method of controlling random access according to the second embodiment of the present invention. As shown in FIG. 10, time slots 60 for random access communications and time slots 61 for continuous communications such as speech communications are separate from each other, and hence will be separately used. FIG. 11 shows an operation sequence of the base station 100 and the mobile station 200 in the method of controlling random access according to the second embodiment of the present invention. Operation of the mobile communication system for carrying out the method of controlling random access according to the second embodiment of the present invention will be described below with reference to FIG. 11.

The base station 100 transmits idle information about a time slot for random access in step 21.

The mobile station 200 receives the transmitted idle information about the time slot for random access in step 22. Then, the mobile station 200 decides whether the time slot for random access is idle or not in step 23. If the time slot for random access is idle, then the mobile station 200 transmits a reservation packet in the time slot for random access according to a spreading code for random access in step 24. If the time slot for random access is not idle, then the mobile station 200 waits until the time slot for random access becomes idle.

In step 25, the base station 100 receives the reservation packet in the time slot for random access according to the spreading code for random access from the mobile station 200. The base station 100 sends information representing a permission, a transmission time, and a spreading code for a packet transmission to the mobile station 200 from which the received reservation packet has been received, in step 26.

In step 27, the mobile station 200 receives the information representing the permission of the packet transmission from the base station 100. The mobile station 200 transmits a packet at the permitted transmission time according to the permitted spreading code in step 28.

Finally, the base station 100 receives the packet from the mobile station 200 at the indicated time according to the indicated spreading code in step 29.

3rd Embodiment

A mobile communication system for carrying out a method of controlling random access according to a third embodiment of the present invention is basically the same as the mobile communication system for carrying out the method of controlling random access according to the first embodiment of the present invention. Therefore, the mobile communication system for carrying out the method of controlling random access according to the third embodiment of the present invention will not be described below in detail.

According to the third embodiment, the mobile station 200 transmits speech information or the like with a packet for random access, without using a reservation packet.

In the third embodiment, broadcast information containing congestion information about a frequency band for random access communications and information about random access communications which have successfully been received by the base station 100 is sent from the base station 100 to the mobile station 200 via a downstream broadcast channel (BCCH).

In the third embodiment, furthermore, if the congestion information contained in the broadcast information sent via the downstream channel represents no congestion, a packet is transmitted from the mobile station 200 to the base station 100 via an upstream random access channel.

FIG. 12 shows an operation sequence of the above process according to the third embodiment. First, the base station 100 transmits congestion information as idle information about a frequency band for random access in step 31.

The mobile station 200 receives the congestion information in step 32. The mobile station 200 decides whether the congestion information represents no congestion, i.e., whether the frequency band for random access is idle or not, in step 33. If the congestion information represents no congestion, i.e., if the frequency band for random access is idle, then the mobile station 200 transmits a desired packet for random access in the frequency band for random access according to a spreading code for random access in step 34. If the frequency band for random access is not idle, then the mobile station 200 waits until the frequency band for random access becomes idle.

The base station 100 receives the packet for random access from the mobile station 200 in the frequency band for random access according to the spreading code in step 35. The base station 100 indicates to the mobile station 200 that the reception of the packet for random access communications has been successful in step 36.

4th Embodiment

A mobile communication system for carrying out a method of controlling random access according to a fourth embodiment of the present invention is basically the same as the mobile communication system for carrying out the method of controlling random access according to the first embodiment of the present invention. Therefore, the mobile communication system for carrying out the method of controlling random access according to the third embodiment of the present invention will not be described below in detail.

According to the fourth embodiment, the mobile station 200 transmits desired information with a packet for random access, without using a reservation packet.

In the fourth embodiment, broadcast information containing congestion information about a time slot for random access communications and information about random access communications which have successfully been received by the base station 100 is sent from the base station 100 to the mobile station 200 via a downstream broadcast channel.

In the fourth embodiment, furthermore, a packet is transmitted from the mobile station to the base station via an upstream random access channel. Specifically, if the congestion information about the time slot for random access communications, contained in the broadcast information, represents no congestion, the packet is transmitted in the time slot which is idle. In this manner, packets are transmitted at random from the mobile station to the base station. When the reception of the packet is successful, the base station transmits the information about random access communications which have successfully been received, contained in the broadcast information.

FIG. 13 shows an operation sequence of the above process according to the fourth embodiment. First, the base station 100 transmits idle information about a time slot for random access in step 41. The mobile station 200 receives the idle information about the time slot for random access in step 42.

The mobile station 200 decides whether the time slot for random access is idle or not, in step 43. If the time slot for random access is idle, then the mobile station 200 transmits a packet for random access in the time slot for random access according to a spreading code for random access in step 44. If the time slot for random access is not idle, then the mobile station 200 waits until the time slot for random access becomes idle.

The base station 100 receives the packet for random access from the mobile station 200 in the frequency band for random access according to the spreading code in step 45. The base station 100 indicates to the mobile station 200 that the reception of the packet for random access communications has been successful in step 46.

According to the present invention, as described above, in a mobile communication system based on CDMA, continuous communications such as speech communications are prevented from being interrupted regardless of whether the load of random access communications is large or small, so that the quality of communications is kept at a high level.

While preferred embodiments of the present invention have been described using specific terms, such description is for illustrative purposes only, and it is to be understood that changes and variations may be made without departing from the sprit or scope of the following claims.

What is claimed is:

1. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code for the random access communications from said mobile station to said base station.

2. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a symbol rate for the random access communications from said mobile station to said base station.

3. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code and lowering a symbol rate for the random access communications from mobile station to said base station.

4. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel and congestion information about a frequency band for the random access communications via a broadcast channel from the base station to the mobile station;

effecting random access communications via said random access channel from said mobile station to said base station, to thereby reserve an idle communication channel if the congestion information about the frequency band for the random access communications indicates no congestion;

broadcasting said mobile station of information that the reservation of the idle communication channel is accepted and information about conditions for a packet transmission from said base station, if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code, for the random access communications from said mobile station to said base station.

5. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel and congestion information about a frequency band for the random access communications via a broadcast channel from the base station to the mobile station;

effecting random access communications via said random access channel from said mobile station to said base station, to thereby reserve an idle communication channel if the congestion information about the frequency band for the random access communications indicates no congestion;

broadcasting said mobile station of information that the reservation of the idle communication channel is accepted and information about conditions for a packet transmission from said base station, if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a symbol rate for the random access communications from said mobile station to said base station.

6. A method of controlling random access in a mobile communication system, comprising the steps of:

establishing a random access channel for use in random access communications in a frequency band different from a frequency band for continuous communications between a mobile station and a base station;

transmitting broadcast information containing idle information about a communication channel and congestion information about a frequency band for the random access communications via a broadcast channel from the base station to the mobile station;

effecting random access communications via said random access channel from said mobile station to said base station, to thereby reserve an idle communication channel if the congestion information about the frequency band for the random access communications indicates no congestion;

broadcasting said mobile station of information that the reservation of the idle communication channel is accepted and information about conditions for a packet transmission from said base station, if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code and lowering a symbol rate for the random access communications from said mobile station to said base station.

7. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

lowering a spreading ratio at which to spread a symbol to be transmitted according to a spreading code, for the random access communications from said mobile station to said base station; and starting to transmit a packet from said mobile station to said base station via the reserved idle communication channel according to the condition for the packet transmission when said mobile station receives the information that the reservation of the idle communication channel is accepted and the information indicative of the condition for the packet transmission.

8. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

lowering a symbol rate for the random access communications from said mobile station to said base station; and starting to transmit a packet from said mobile station to said base station via the reserved idle communication channel according to the condition for the packet transmission when said mobile station receives the information that the reservation of the idle communication channel is accepted and the information indicative of the condition for the packet transmission.

9. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel via a broadcast channel from the base station to the mobile station;

effecting random access communications via said random access channel from said mobile station to said base station, to thereby reserve an idle communication channel;

broadcasting said mobile station of information that the reservation of the idle communication channel is accepted and information indicative of a condition for a packet transmission from said base station if said base station accepts the reservation of the idle communication channel;

lowering a spreading ratio at which to spread a symbol to be transmitted according to a spreading code and lowering a symbol rate for the random access communications from said mobile station to said base station; and starting to transmit a packet from said mobile station to said base station via the reserved idle communication channel according to the condition for the packet transmission when said mobile station receives the information that the reservation of the idle communication channel is accepted and the information indicative of the condition for the packet transmission.

10. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel and congestion information about a time slot for the random access communications via a broadcast channel from the base station to the mobile station;

effecting random access communications via said random access channel from said mobile station to said base station, to thereby reserve an idle communication channel if the congestion information about the time slot for the random access communications represents no congestion;

broadcasting said mobile station of information that the reservation of the idle communication channel is accepted and information indicative of a condition for a packet transmission, from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code, for the random access communications from said mobile station to said base station.

11. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel and congestion information about a time slot for the random access communications via a broadcast channel from the base station to the mobile station;

effecting random access communications via said random access channel from said mobile station to said base station, to thereby reserve an idle communication channel if the congestion information about the time slot for the random access communications represents no congestion;

broadcasting said mobile station of information that the reservation of the idle communication channel is accepted and information indicative of a condition for a packet transmission, from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a symbol rate for the random access communications from said mobile station to said base station.

12. A method of controlling random access in a mobile communication system, comprising the steps of:

establishing a random access channel for use in random access communications in a time slot different from a time slot for continuous communications between a mobile station and a base station;

transmitting broadcast information containing idle information about a communication channel and congestion information about a time slot for the random access communications via a broadcast channel from the base station to the mobile station;

effecting random access communications via said random access channel from said mobile station to said base station, to thereby reserve an idle communication channel if the congestion information about the time slot for the random access communications represents no congestion;

broadcasting said mobile station of information that the reservation of the idle communication channel is accepted and information indicative of a condition for a packet transmission, from said base station if said base station accepts the reservation of the idle communication channel;

starting to transmit a packet from said mobile station to said base station via the reserved idle communication channel according to the condition for the packet transmission when said mobile station receives the information that the reservation of the idle communication channel is accepted and the information indicative of the condition for the packet transmission; and lowering a spreading ratio at which to spread a symbol to be transmitted according to a spreading code and lowering a symbol rate for the random access communications from said mobile station to said base station.

* * * * *